United States Patent [19]

Kobayashi

[11] Patent Number: 4,662,236
[45] Date of Patent: May 5, 1987

[54] MECHANISM FOR AUTOMATICALLY REGULATING TENSION OF WIRES EMPLOYED IN A WINDOW REGULATOR

[75] Inventor: Tetuo Kobayashi, Ikeda, Japan
[73] Assignee: Nippon Cable System Inc., Hyogo, Japan
[21] Appl. No.: 669,494
[22] Filed: Nov. 8, 1984
[30] Foreign Application Priority Data Jan. 20, 1984 [JP] Japan .................................. 59-9353

[51] Int. Cl.$^4$ .............................................. F16C 1/10
[52] U.S. Cl. ................................................. 74/501 R
[58] Field of Search ................... 74/501.5 R, 501, 505, 74/506, 501 R, 501 A; 49/352, 360; 242/54 R; 254/364, 365

[56] References Cited

U.S. PATENT DOCUMENTS

| 4,400,913 | 8/1983 | Krantz et al. | 49/352 |
| 4,400,993 | 8/1983 | Kobayashi et al. | 74/501 |
| 4,440,354 | 4/1984 | Kobayashi et al. | 254/54 |

FOREIGN PATENT DOCUMENTS 1382330  3/1972  United Kingdom .

Primary Examiner—Albert J. Makay
Assistant Examiner—David W. Westphal
Attorney, Agent, or Firm—Armstrong, Nikaido, Marmelstein & Kubovcik

[57] ABSTRACT

A mechanism for automatically regulating tension of wires employed in a window regulator comprising a drum being provided for rotational movement within said housing, and having a first side surface provided with a first ratchet teeth, a second side surface provided with a first engaging portion for engaging a first wire end, and a peripheral surface as winding surface; a ratchet plate being adjacent to said drum coaxially, and having a surface provided with a second ratchet teeth engaging said first ratchet teeth and a second engaging portion engaging a second wire end; a spiral spring having one end engaged with said ratchet plate and having the other end engaged with said housing, and urging said ratchet plate in such direction that said first ratchet teeth and said second ratchet teeth are moved idly; an elastic member axially urging said drum toward said ratchet plate; and a shaft for operating said drum to rotate by means of engaging with said drum. The mechanism of the present invention can employ a spiral spring having a larger diameter, and therefore, functions of regulating tension of wires and of balancing the force for raising a window glass with the force for lowering the window glass operate smoothly.

4 Claims, 6 Drawing Figures

MECHANISM FOR AUTOMATICALLY REGULATING TENSION OF WIRES EMPLOYED IN A WINDOW REGULATOR

BACKGROUND OF THE INVENTION

The present invention relates to a novel mechanism for automatically regulating tension of wires employed in a window regulator (hereinafter referred to as "mechanism"), and, more particularly, to a mechanism which is used in a driving device of the window regulator and which can automatically eliminate looseness or permanent elongation of wires.

Until now, a window regulator, in which flexible wires are employed as a power transmitting means, has been used in doors of a car, or the like. In such a window regulator, looseness due to backlash or play of various connecting portions in the window regulator occurs in the wires and further, a permanent elongation occurs in the wires in the course of operation. Also, looseness tends to remain in the wires after the window regulator is assembled.

Such looseness or permanent elongation of wires causes the following disadvantages: For example, a window glass shakes in the up-and-down directions due to vibration of a car, or the like; a crank lever shakes due to vibration of a car, or the like; the window glass is stained since greased wires come in touch with the window glass; and a whipping noise of wires is generated in the doors due to vibration of a car, or the like. Such disadvantages offend a driver, or the like. Further, loosed wires tend to come off from a guide member or a pulley for guiding wires, and tend to be damaged. Therefore, the window regulator becomes inoperable occasionally.

Therefore, hitherto there has been proposed various means for eliminating looseness or permanent elongation of wires in order to suitably regulate tension of wires.

For example, there has been a tension-regulating mechanism for extending the length of wire-path, by means of a spring urging an outer casing (conduit), capable of slidably guiding a wire, toward an associating member with which the outer casing is to associate at one end of the outer casing, or by means of a tension pulley. Further, Italian Patent No. 927,030 (corresponding to British Patent No. 1382330) discloses another mechanism which can eliminate looseness of wires by means of manually rotating a ratchet plate relatively to the drum. The ratchet plate is adjacent to a wire-winding drum having a ratchet teeth and engaging with an end of a wire.

However, as to the former mechanism, there is a problem that it is somewhat hard to operate the device, since the wire is always stretched strongly. As to the latter mechanism, there are some problems that it is practically impossible to regulate tension of wires after the mechanism is installed in an inside of a door of a car, or the like.

As a solution of those problems, U.S. Pat. No. 4,440,354 proposes mechanisms. In one mechanism, a winding drum is divided into a first pulley and a second pulley. Both pulleys are engaged with each other, are capable of rotating in the relative direction, and have ratchet teeth on the facing side surfaces respectively. One end of each wire is engaged with the first pulley and the second pulley, respectively. In another mechanism, a cavity, in which a spiral spring can be contained, is dug in the second pulley. However, the former mechanism has no function of balancing between force for raising the window glass and force for lowering the window glass, and no function of reducing the force for raising the window glass, since a spiral spring is not employed. As to the latter mechanism, in spite of having the spiral spring, the size of the spiral spring is restricted by the size (the diameter and the depth) of the cavity dug in the second pulley. Accordingly, the spiral spring is not substantially employed in the latter mechanism, except a spiral spring of which diameter and width are small, i.e. the urging force of the spiral spring is weak. Namely, the relative rotation of the first pulley and the second pulley is caused by a torque of a crank lever, by a braking force, i.e. a frictional resistance which is applied to the second pulley when the first pulley is rotated, and by the urging force of the spiral spring. However, the frictional resistance is not a suitable element, since the frictional resistance depends upon various conditions, i.e. roughness of each contacting surface, pressure between the pulleys, existence of some adhesion on the sliding portions, and the like. Also, the frictional resistance changes due to abrasion generated in the course of operation. Therefore, a dispersion of tension values becomes broad occasionally. Further, labor of the operation is large in case of rotating the second pulley since the frictional resistance is applied to the second pulley not only in one direction but also in the opposite direction.

In order to solve the above problems, it is desired that the spiral spring having high urging force as much as possible is employed. Namely, if the urging force of such spiral spring rotates the ratchet teeth in the direction of idling movement, tension can be regulated more precisely, and the operational labor can be decreased, as compared with the case of the above frictional resistance.

"Idling movement" or "move idly" described in the specification means that, when a torque due to the relative rotation of a first ratchet teeth and a second ratchet teeth by means of rotating a crank lever generates, slant portions of the first ratchet teeth and the second ratchet teeth slip in the rotational direction with each other, and both ratchet teeth move axially in the opposed direction with each other, and at last the ratchet teeth engage again. Further, the conception of "idling movement" or "move idly" includes not only a case that one ratchet teeth moves in the axial direction and rotates around the axis, but also various cases, e.g. the case that one ratchet teeth moves in the axial direction and the other ratchet teeth rotates around the axis, or the case that both of the ratchet teeth move axially so as to depart away with each other, and one or both ratchet teeth rotate around the axis in the opposite directions.

On the other hand, when the spiral spring is adapted to support weight of the window glass or to balance the force for raising the window glass with the force for lowering the window glass, the urging force for balancing is not sufficient, since the size of the spiral spring is restricted by the size of the cavity dug in the conventional second pulley. In this respect, it is desired that the urging force of the spiral spring is increased as much as possible. Particularly, it is desired that the diameter, in the state of setting, of the spiral spring is large as much as possible in order to thin the whole thickness of the mechanism.

However, it is desired to reduce the operational force of the crank lever by means of increasing a ratio of a length of the crank lever to the diameter of the second pulley, i.e. by means of decreasing the diameter of the pulley. In order to satisfy the contradictory demands at the same time, it is thinkable to take out the spiral spring from the cavity of the second pulley, and to locate at another portion. However, in that case, there happens a problem that the whole thickness of the driving device increases.

OBJECT OF THE INVENTION

The object of the invention is to provide a mechanism which can satisfy the above contradictory demands, i.e. employing a spiral spring having a larger diameter, increasing the ratio of the length of the crank lever to the diameter of the pulley (hereinafter referred to as "lever ratio"), and reducing the thickness of the mechanism, and whereby the function of regulating tension of wires and the function of balancing the force for raising the window glass with the force for lowering the window glass operate smoothly.

SUMMARY OF THE INVENTION

In accordance with the invention, there can be provided a mechanism for automatically regulating tension of wires employed in a window regulator comprising:

(a) a housing;

(b) a drum being provided for rotational movement within the housing, and having a first side surface provided with a first ratchet teeth, a second side surface provided with a first engaging portion for engaging a first wire end and a peripheral surface as a wire-winding surface;

(c) a ratchet plate being adjacent to the drum coaxially, and having a surface provided with a second ratchet teeth engaging the first ratchet teeth of the drum and a second engaging portion for engaging a second wire end;

(d) a spiral spring having one end engaged with the ratchet plate and having the other end engaged with the housing, and urging the ratchet plate in such direction that the first ratchet teeth and the second ratchet teeth are moved idly;

(e) an elastic member axially urging the drum toward the ratchet plate; and (f) a shaft for rotating the drum by means of engaging with the drum.

The above and other objects and advantages of the present invention will become apparent from the following description with reference to the accompanying drawings.

DETAILED DESCRIPTION OF THE INVENTION

Figure 1:
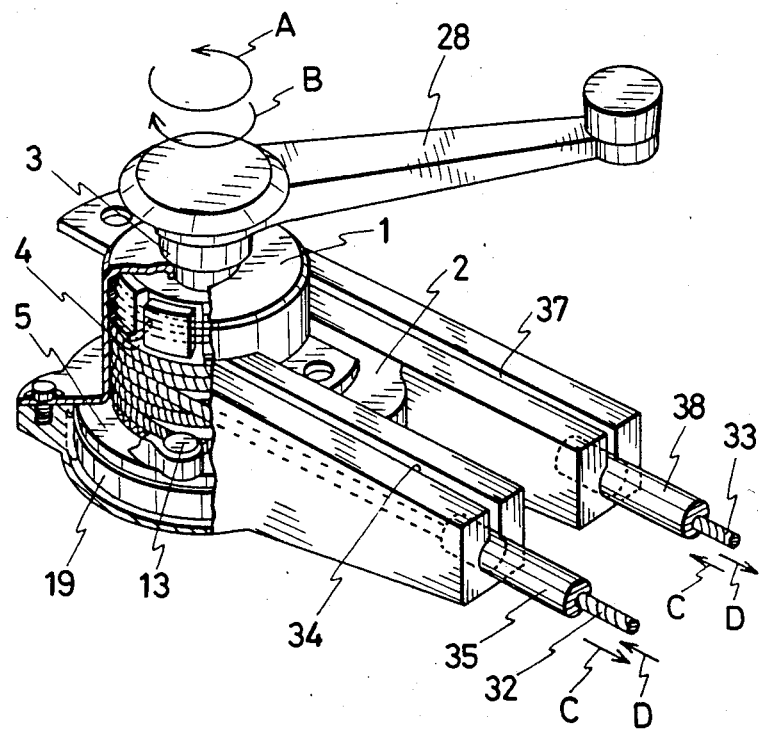
FIG. 1 is a partially cutaway perspective view showing an embodiment of the mechanism of the invention.
Figure 2:
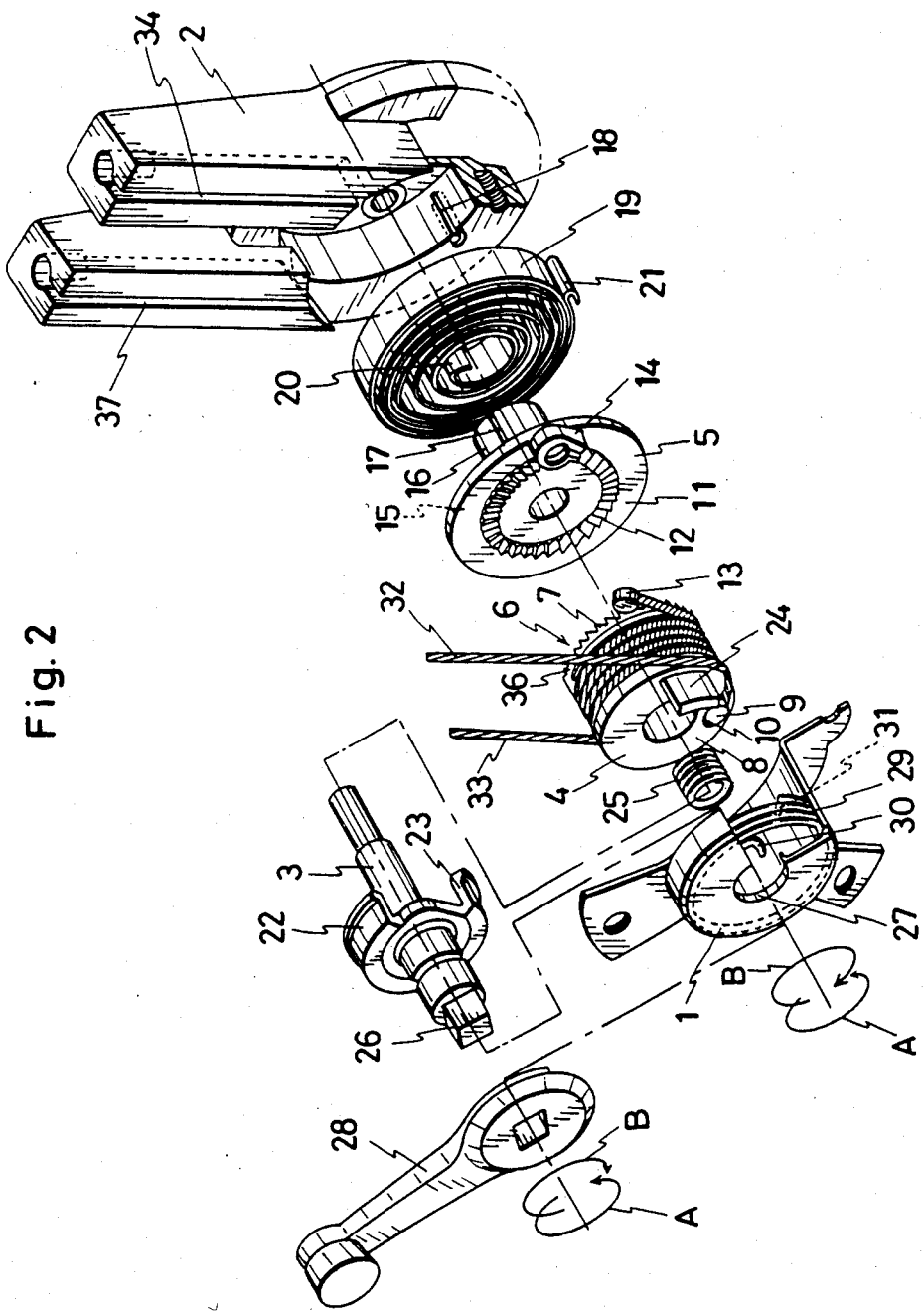
FIG. 2 is an exploded view in perspective of the embodiment of the mechanism of the invention shown in FIG. 1.

In FIG. 1 and FIG. 2, numerals 1, 2 indicate a first housing and a second housing, respectively. A housing consists of the first housing 1 and the second housing 2. The housing contains and supports a rotatable shaft 3. A drum 4 and a ratchet plate 5 are rotatably mounted on the shaft 3 and are adjacent to each other. The drum 4 is capable of moving in the axial direction on the shaft 3.

A first side surface 6 of the drum 4 is provided with a first ratchet teeth 7. A second side surface 8, which is an opposite surface to the first side surface 6, is provided with a first engaging portion 10 with which a first wire end 9 is engaged. A first side surface 11, adjacent to the drum 4, of the ratchet plate 5, is provided with a second ratchet teeth 12 capable of engaging with the first ratchet teeth 7 and a second engaging portion 14 with which a second wire end 13 is engaged, respectively.

On a second side surfece 15 of the ratchet plate 5, a boss 16, which is provided with a first engaging groove 17, is projected. Also, an inner peripheral surface of the second housing 2 is provided with a second engaging groove 18.

A spiral spring 19 is contained within the second housing 2. Both ends 20, 21 of the spiral spring 19 are inserted into the first engaging groove 17 and the second engaging groove 18, respectively. The spiral spring 19 urges the ratchet plate 5 in such direction that idling movement is generated, i.e. in the direction of Arrow A.

A cup-like associating member 22 is fixed to the shaft 3, and a fan-shaped notch portion 23 is formed on the cylindrical side portion of the associating member 22. The second side surface 8 is provided with an associating projection 24 capable of associating with the fan-shaped notch portion 23 with some play in the rotational direction.

An elastic member, e.g. a coil spring 25, is located between the drum 4 and the associating member 22. The coil spring 25 urges axially the drum 4 toward the ratchet plate 5. An end 26 of the shaft 3 projects from a perforation 27 of the first housing 1, and a crank lever 28 is fixed to the end 26 of the shaft 3. A brake spring 29, which is known conventionally, is inserted between an inner peripheral surface of the first housing 1 and an outer peripheral surface of the associating member 22, and both ends 30, 31 of the brake spring 29 are inserted into gaps between the fan-shaped notch portion 23 and the associating projection 24, respectively.

A peripheral surface of the drum 4 is used as a wire-winding surface 36 for winding a first wire 32 and a second wire 33. The first wire 32 and the second wire 33 are wound in the same spiral direction (in case of Fig. 2, in the spiral direction like a left handed screw), respectively. The first wire end 9 of the first wire 32 is engaged with the first engaging portion 10. The first wire 32 is spirally wound toward the first side surface 6 side, goes away from the drum 4 on its way, and is guided into a first outer casing 35 through a first guiding groove 34 of the second housing 2. The second wire end 13 of the second wire 33 is engaged with the second engaging portion 14 of the ratchet plate 5. The second wire 33 is wound around the winding surface from the first side surface 6 side toward the second side surface 8 side, goes away from the drum 4 on its way, and is guided into a second outer casing 38 through a second guiding groove 37. The other each end of the first wire 32 and the second wire 33 are engaged with a carrier plate 41 of a driven portion 40 of a window regulator 39, as described later. Accordingly, the first wire 32 and the second wire 33 form a closed loop substantially.

Hereinafter, the functions of the mechanism of the invention will be described. In order to clearly describe the functions of the mechanism, the mechanism employed in the window regulator 39 is described as a typical case. However, the use of the mechanism of the invention is not limited to the typical case. Namely, the mechanism can be applied into various devices employing wires as power transmitting means.

Figure 3:
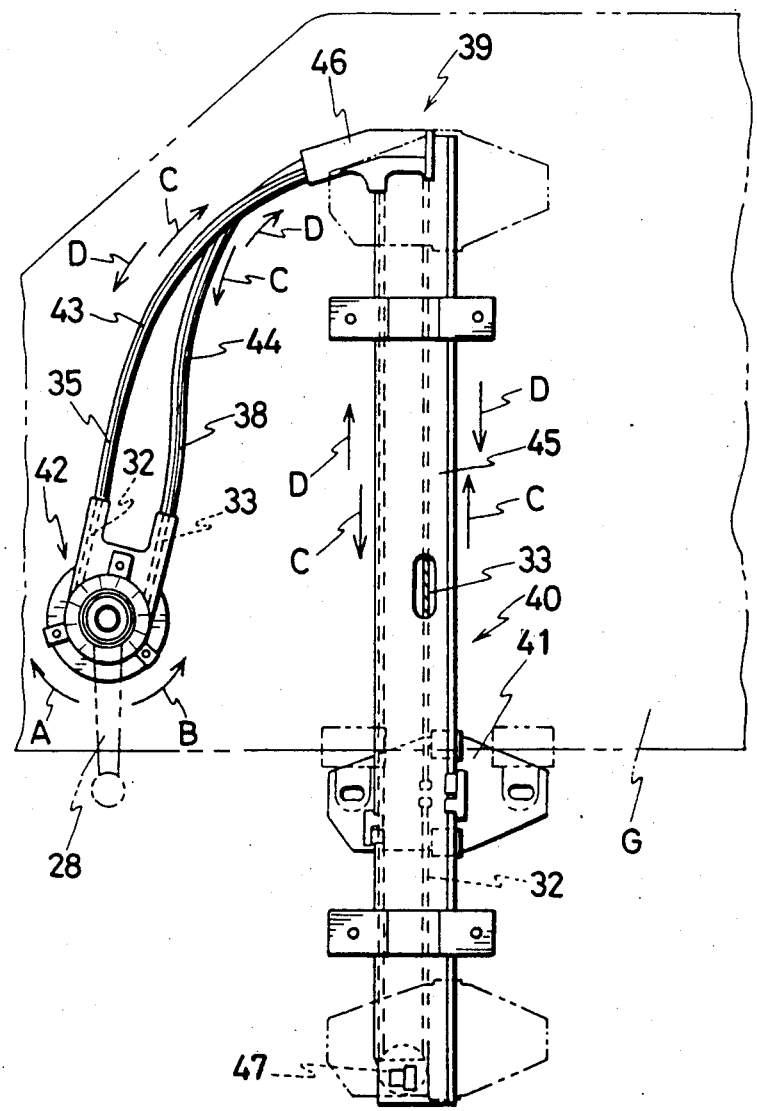
FIG. 3 is a front view showing a window regulator having the mechanism of the invention.

In FIG. 3, a numeral 42 indicates a driving portion of the window regulator 39. The driving portion 42 is connected to the dirven portion 40 by means of two control cables 43, 44. The mechanism of the present invention is contained in the driving portion 42. The driven portion 40 has a guide rail 45 and a carrier plate 41 slidably mounted on the guide rail 45. In order to change the moving direction of the wires 32, 33, a wire guide (or a pulley) 46 is mounted on the upper end of the guide rail 45. Similarly, in order to change the moving direction of the wire 32, a pulley (or a wire guide) 47 is set to the lower end of the guide rail 45.

The control cable 43 comprises a first wire 32 and a first outer casing 35 for slidably guiding the first wire 32, and similarly, the control cable 44 comprises a second wire 33 and a second outer casing 38. That is to say, the control cables 43, 44 are pull-control cables.

As to the window regulator 39 constructed as mentioned above, when the crank lever 28 is rotated in the direction of Arrow A, the second wire 33 is wound around the drum 4 and the first wire 32 is unwound from the drum 4. Therefore, the closed loop circulates in the direction of Arrow C, and a window glass G fixed to the carrier plate 41 is raised. In case that the crank lever 28 is rotated in the direction of Arrow A, the drum 4 and the ratchet plate 5 rotate together in the same direction, since the first ratchet teeth 7 and the second ratchet teeth 12 are firmly engaged with each other.

Further, when the crank lever 28 is rotated in the direction of Arrow B, the first wire 32 is wound around the drum 4 and the second wire 33 is unwound from the drum 4. Therefore, the closed loop circulates in the direction of Arrow D, and the window glass G is lowered. In that case, though the direction of Arrow B is the direction of idling movement, the drum 4 and the ratchet plate 5 rotate together in the same direction, since the second wire 33 pulls the ratchet plate 5 to rotate, and since the coil spring 25 urges the drum toward the ratchet plate and causes the ratchet plate to be rotated in the direction of Arrow B.

Since the length of the wound part of one wire around the drum 4 is equal to the length of the unwound part of the other wire from the drum 4 without reference to the rotational direction, the one wire is wound on the portion where the other wire is unwound, subsequently. Namely, the mechanism of the invention has only one winding surface 36 instead of two winding surfaces for winding two wires. Therefore, the thickness of the drum 4 can be thinned. Accordingly, as mentioned later, even if a spiral spring 19 having a large diameter in a state of setting and the drum 4 are axially formed in a row, the whole thickness of the mechanism can be thinned.

Subsequently, the function of automatically eliminating looseness of the wires 32, 33 will be described.

In case that looseness is generated in the wires, when the drum 4 is rotated in the direction of Arrow B by means of rotating the crank lever 28 in the direction of Arrow B, the second wire 33 does not pull the ratchet plate 5 in the direction of Arrow B. Further, the ratchet plate 5 is in a state of being braked by the urging force of the spiral spring 19 in the direction of Arrow A and further by, for instance, frictional resistance between the rachet plate 5 and the shaft 3. Therefore, the drum 4, receiving torque in the direction of Arrow B, moves toward the second side surface 8 in the axial direction against the urging force of the coil spring 25. The first ratchet teeth 7 climbs over the second ratchet teeth 12, and at last the first ratchet teeth and the second ratchet teeth engage with each other again at the new shifted position by means of the urging force of the coil spring 25. Namely, idling movement occurs. Accordingly, only the drum 4 rotates in the direction of Arrow B, so that the relative rotation of the drum 4 and the ratchet plate 5 is performed. Therefore, the second wire 33 slides on the winding surface of the drum 4, and is unwound toward the second engaging portion 14 side. As a result, looseness of the wires is eliminated.

After tension of the wires is recovered, the ratchet plate 5 and the drum 4 are rotated together again.

As to the mechanism of the invention, in case that the urging force of the spiral spring 19 is stronger than the required force for making the first ratchet teeth 7 and the second ratchet teeth 12 to move idly (the required force also depends upon the urging force of the coil spring 19, and the inclination angle of each tooth of the ratchet teeth 7, 12), as mentioned later, the spiral spring 19 drives the ratchet plate 5 to rotate positively in the direction of Arrow A, as well as the spiral spring 19 gives the braking force to the ratchet plate 5. Therefore, tension of wires are regulated more accurately. In that case, the crank lever 28 can be stayed still.

Namely, when looseness is generated in the wires, the ratchet plate 5, which is urged by the spiral spring 19 in the direction of Arrow A, is rotated in the direction of Arrow A due to idling movement. As a result, the second wire end 13 is pulled in the direction of Arrow A, the second wire 33 is pulled out of the winding surface 36 of the drum 4, and at last the first ratchet teeth 7 and the second ratchet teeth 12 are engaged with each other by means of the coil spring 25 at the position that tension of the wires is in proportion to the urging force of the coil spring 25. Accordingly, since looseness of the wires is eliminated, the suitable tension of the wire is recovered. When only the ratchet plate 5 is rotated by the spiral spring 19, the drum 4 is braked by the urging force of the brake spring 29, or by the frictional force between the drum 4 and the shaft 3. In case that the crank lever 28 is stayed still, the operation of eliminating looseness of the wires tends to be obtained in the state that the drum 4 is sufficiently rotated in the direction of Arrow B. This is based on reasons that the urging force of the spiral spring 19 is increased in proportion to the amount of winding of the spiral spring, and further the amount of winding of the second wire 33 around the drum 4 is small in the state mentioned above.

In case that the driving portion 42 having the mechanism of the invention is connected to the driven portion 40, so that such direction that the spiral spring 19 urges the ratchet plate corresponds to such direction that the window glass is raised, the spiral spring 19 functions as a known balance spring.

Namely, since the spiral spring 19 always urges the closed loop of the wires in the direction of Arrow C as shown in FIG. 3, the weight of the window glass G is balanced with the urging force of the spiral spring 19. Therefore, the operational force of the crank lever has nothing to do with the rotational directions of the crank lever 28, and the operation is made easy. Further, the labor to raise the window glass G is reduced. In that case, when the window glass is lowered, the spiral spring 19 is fastened. On the other hand, when the window glass is raised, the spiral spring 19 is loosed.

In the mechanism of the invention, the spiral spring 19 is located in a series state with the drum 4 and the ratchet plate 5, without being contained in the drum 4. Therefore, the lever ratio can be increased by means of reducing the diameter of the drum 4. Further, the function of balancing is made good by means of adapting the spiral spring which has a large diameter in the state of setting. More further, the thickness of the drum 4 can be thinned, i.e. the whole thickness of the mechanism can be thinned, since the drum 4 serves as both winding drums for the first wire 32 and the second wire 33.

Since the diameter of the spiral spring 19 is not limited by the diameter of the drum 4, the diameter of the spiral spring 19, in the state of setting, can be made larger than the diameter of the drum 4. Therefore, the spiral spring having a strong urging force can be employed.

In that case, as shown in FIGS. 1 and 2, if the housing consists of two divided housings, i.e. the first housing 1 for containing the drum 4 and the second housing 2 for containing the spiral spring 19, it is easy to assemble the driving device having the machanism. The ratchet plate 5 can be contained in the second housing 2. Further, as shown in FIG. 6, the ratchet plate 5 can be contained in the first housing 1.

In the mechanism shown in FIGS. 1 and 2, the second engaging portion 14 is located outside the second ratchet teeth 12, but it is desired to make the second engaging portion 14 to approach the center of the rotation so as to effectively utilize the urging force of the spiral spring 19.

Figure 4:
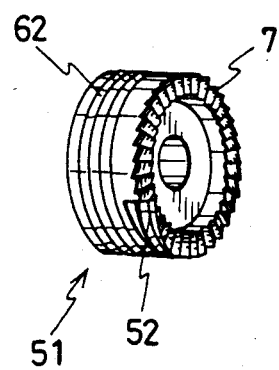
FIG. 4 is a perspective view showing another embodiment of a drum in the mechanism of the invention.
Figure 5:
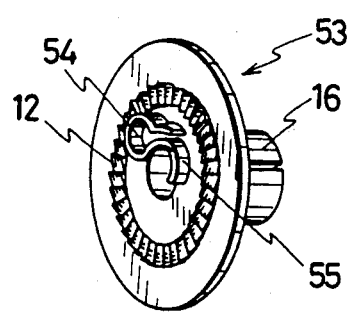
FIG. 5 is a perspective view showing another embodiment of a ratchet plate in the mechanism of the invention.
Figure 6:
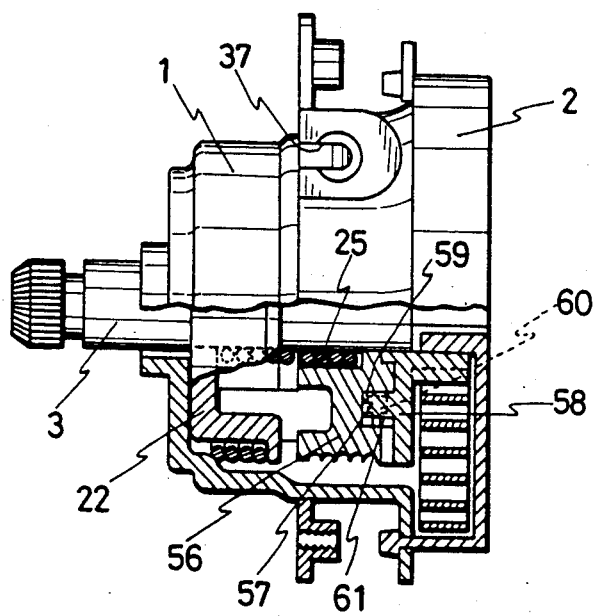
FIG. 6 is a partially cutaway side view of another embodiment of the mechanism of the invention.

Referring to FIGS. 4 to 6, such preferred embodiment of the mechanism of the invention will be described.

In the drum 51 shown in FIG. 4, a part 52 of the winding surface adjacent to the first side surface 6 extends to the inside of the first ratchet teeth 7. In that case, even if the first ratchet teeth is destroyed partially, i.e. the first rathcet teeth is not a complete ring-shaped ratchet teeth, the function of the first ratchet teeth can be maintained.

In FIG. 5, the ratchet plate 53 which is associated with the drum 51 in FIG. 4 is shown. In that case, the second engaging portion 54 is located inside the second ratchet teeth 12.

Further, as shown in FIG. 5, when a guide surface 55 is formed as the extending portion of the second engaging portion 54, the guide surface 55 can guide a portion adjacent to the wire end advantageously.

In the mechanism shown in FIG. 6, a drum 56 is provided with a cylindrical groove 57 concentrically. Further, the drum 56 has a guide channel (not shown in the drawing) which is similar to the part 52 (shown in FIG. 4). The ratchet plate 58 is provided with a cylindrical projection 59 which is engaged in the cylindrical groove 57. The cylindrical projection 59 is provided with a second engaging portion 60. An outer peripheral surface 61 of the cylindrical projection 59 is formed as a wire-winding surface.

According to the above mechanism, a part of wire can be wound on the outer peripheral surface 61 of the cylindrical projection 59 continuously, due to the motion that the drum 56 and the ratchet plate 58 rotate in the reverse direction with each other. Accordingly, even in case that the extents of looseness or permanent elongation of wires are greatly increased, the mechanism can be sufficiently applied to.

In the above mentioned embodiments, it is desired that the winding surface of the drum is provided with a spiral winding groove (for example, the portion indicated as a numeral 62 in FIG. 4), so that the wires are wound in order without being intertwisted with each other.

With respect to the mechanism of the invention, when the second engaging portion 14 is higher than the second ratchet teeth 12 in the axial direction, the second wire 33 does not preferably interfere with the ratchet teeth 7, 12. Such preferable embodiment can be realized, for example, by means of projecting the second engaging portion 14 from the surface of the ratchet plate 5 as shown in FIG. 2 or FIG. 5, or by means of forming the second engaging portion 60 within the cylindrical projection 59 as shown in FIG. 6. In that case, such part of the winding groove 62, which is nearest to the first side portion 6, is formed into a circular groove instead of a spiral groove.

As mentioned above, according to the invention, the spiral spring having a larger diameter, and therefore, having a stronger urging force can be employed; the lever ratio can be increased; the thickness of the mechanism can be made thin; and therefore, the function of regulating tension of wires and the function of balancing force for raising a window glass with force for lowering the window glass can operate smoothly. Accordingly, the practical value becomes extremely great.

Though several embodiments of the invention are described in detail, it is to be understood that the present invention is not limited to the above embodiments, and various changes and modifications may be made in the invention without departing the spirit and the scope thereof.

What is claimed is:

1. A mechanism for automatically regulating tension of wires employed in a window regulator comprising:
    (a) a housing;
    (b) a drum being provided for rotational movement within said housing, and having a first side surface provided with a first ratchet teeth, a second side surface provided with a first engaging portion for engaging a first wire end, and a peripheral surface as a winding surface, said first side surface of said drum having a cylindrical groove around the axis of said drum having a spiral winding groove extending from said peripheral surface of said drum adajacent to said first side surface toward said cylindrical groove;
    (c) ratchet plate being adjacent to said drum coaxially, and having a surface provided with a second ratchet teeth engaging said first ratchet teeth of said drum and a second engaging portion for engaging a second wire and located inside said second ratchet teeth in the radial direction, said ratchet plate further having a cylindrical projection capable of being inserted in said cylindrical groove, said cylindrical projection having said second engaging portion, and a winding surface is mounted on a peripheral surface of said cylindrical projection;

(d) a spiral spring having one end engaged with said ratchet plate and having the other end engaged with said housing, and urging said ratchet plate in such direction that said first ratchet teeth and said second ratchet teeth are moved idly;

(e) an elastic member axially urging said drum toward said ratchet plate; and (f) a shaft for rotating said drum by means of engaging with said drum.

2. The mechanism of claim 1, wherein said urging direction of said spiral spring corresponds to a direction of raising a window glass.

3. The mechanism of claim 1, wherein urging torque of said spiral spring is larger than torque of idling movement of said first ratchet teeth and said second ratchet teeth.

4. The mechanism of claim 1, wherein a diameter of said spiral spring in a state of setting in said housing is larger than a diameter of said drum.

* * * * *